June 11, 1935.  T. J. SMULSKI  2,004,421

INDICATING APPARATUS

Filed Oct. 4, 1930

INVENTOR.
Theodore J. Smulski
BY Slaugh and Canfield
ATTORNEY.

Patented June 11, 1935

2,004,421

UNITED STATES PATENT OFFICE 2,004,421

INDICATING APPARATUS

Theodore J. Smulski, Gary, Ind., assignor to The Anderson Company, Gary, Ind., a corporation of Indiana Application October 4, 1930, Serial No. 486,417

7 Claims. (Cl. 177—351)

This invention relates to indicating or registering devices and particularly to devices of this class which are electrically operated.

It is one of the objects of this invention to provide an indicating device responsive to variations of electric current in an improved manner.

Another object is to provide a device of the class described responsive to variations of electric current effected by variations of a quantity to be indicated such as pressure, temperature, liquid level etc.

Another object is to provide a device of the class described responsive to variations of electric current and adapted to compensate in an improved manner for variations of voltage of the source of current.

Another object is to provide a device of the class described responsive to the differential effects of a plurality of electric currents, the electric currents varying in response to variations of a quantity to be indicated such as pressure, temperature, liquid level or the like, and adapted to compensate for variations of the voltage of the current source.

Another object of my invention is to provide an electro-responsive device for an electrical system, whether used for purposes of indication, measurement, registration, or control, which inherently contains the elements necessary for substantial compensation relative to such changes in voltage of the source of current employed in connection with such a system, as may ordinarily take place in practice.

Other objects will be apparent to those skilled in the art to which my invention appertains.

My invention is fully disclosed in the following description taken in connection with the accompanying drawing, in which Fig. 1 is a diagrammatic view illustrating an embodiment of my invention;

Figure 1:
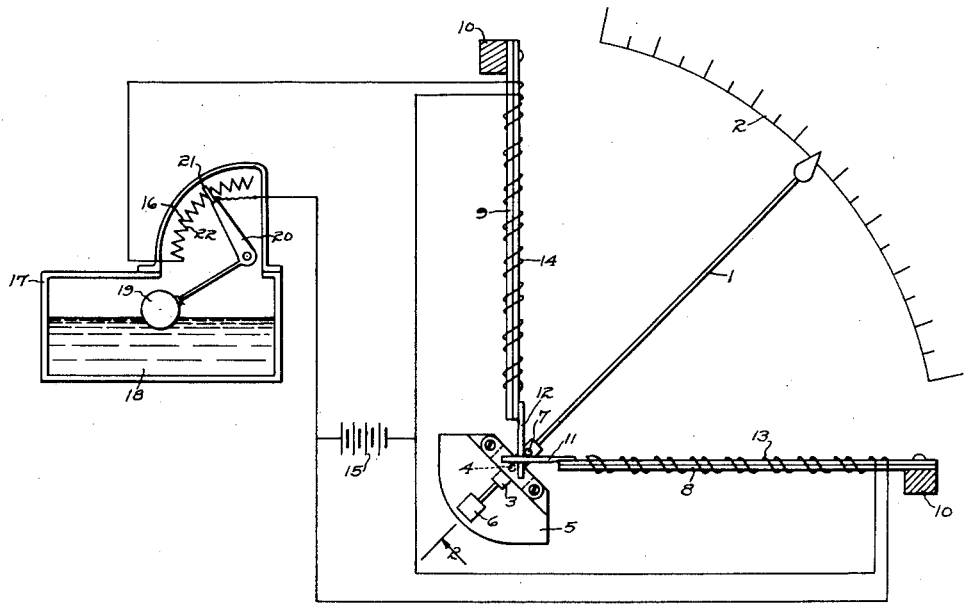
Figure 2:
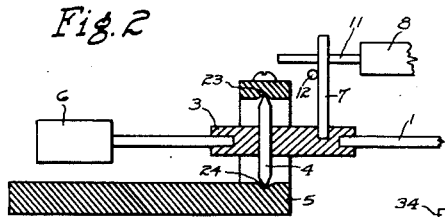
Fig. 2 is a view to an enlarged scale taken approximately from the plane 2 of Fig. 1.

Referring to the drawing, I have shown at 1 an indicating needle or pointer and at 2 a scale which may be calibrated for pressure, temperature, etc. in accordance with the quantity which is to be indicated.

The needle 1 is connected to a head 3 mounted on a shaft 4 which has, at its opposite ends, pivot bearings at 23 and 24 in a base 5. The head 3 carries a counter weight 6 for balancing the needle 1.

Mounted on the head 3 and disposed substantially parallel to the pivot shaft 4 is a post 7 to which forces to be described may be applied to move the pointer 1 back and forth upon the scale 2.

At 8 and 9 respectively are two thermo-responsive bimetallic elements normally rectilinear in form and preferably disposed at right angles to each other. The elements 8 and 9 are rigidly and stationarily supported at their outer ends to supports 10—10. The inner ends of the elements 8 and 9 are provided each with a finger, the element 8 having a finger 11 and the element 9 a finger 12. The fingers 11 and 12 are so disposed as to overlap each other and the fingers 11 and 12 and the other parts thus far described are so relatively disposed that the fingers make mechanical contact with the post 7 generally on portions thereof toward the shaft 4.

Each of the elements 8 and 9 is provided with a heating winding 13 and 14 respectively adapted to be energized by current from a source such as a battery 15. In the form of my invention shown in Fig. 1, the winding 13 is energized directly across the battery 15. The winding 14 however is energized by the battery 15 in parallel with the winding 13 but the winding 14 has in series therewith a rheostat 16.

My invention is applicable to many uses and to indicate a great variety of variable quantities, but I have chosen to illustrate and describe it in this application in connection with a varying liquid level and to indicate on the scale 2 variations of said liquid level.

To this end therefore I have shown at 17 a tank containing liquid 18 the level of which is to be indicated. A float 19 in the liquid is adapted to operate a rheostat arm 20 and move a contact 21 on the arm 20 back and forth over the rheostat 16 in correspondence with changes of the level of the liquid 18 in a well known manner.

Current from the battery 15 heats the winding 13 and distorts, to a corresponding degree, the element 8 causing it to exert on the post 7, a force, the direction of which as viewed in Fig. 1 is upward, which force tends to rotate the needle counterclockwise on its bearing comprising the shaft 4 and pivots 23 and 24. The winding 14 is similarly heated by current from the battery 15 causing the element 19 to distort and exerts force on the post 7 toward the right, as viewed in Fig. 1, tending to rotate the needle 1 clockwise. The needle 1 thus takes up a position in response to the resultant of the two said forces.

The winding 14 being in series with the resistance 22 of the rheostat 16, the current flowing in the winding 14 will be determined by the position of the contact 21 on the rheostat 16. Preferably it is desired that the needle 1 shall be at about the middle of the scale 2 for an average liquid level 18 and therefore for a position of the contact 21 approximately midway of the rheostat 16. To this end, the resistance of the winding 13 or the heating effect thereof is so proportioned and adjusted that the two elements 8 and 9 will be substantially equally distorted and will hold the needle 1 in the middle position illustrated, when the rheostat contact 21 is at its average liquid level position.

With the instrument thus constructed and adjusted, a variation of liquid level will raise or lower the float 19 and cause the contact 21 to increase the resistance or decrease the same of the rheostat 16 respectively, correspondingly decreasing or increasing the distortion of the element 9 and decreasing or increasing the force which it exerts on the post 7. The distortion of the element 8 remaining substantially constant, the force which it exerts on the post 7 will be substantially constant. Thus the constant force of the element 8 is opposed by the varying force of the element 9 and the needle 1 takes up a position clockwise or counter-clockwise of its middle position in correspondence with the resultant of said forces, and as will now be understood, indicates on the scale 2 the level of liquid 18 in the tank 17. The two forces will be equal and the needle will take up its middle position and indicate the average of liquid in the tank when the liquid is at said average level.

It is one of the advantages of my invention that the position of the needle 1 and the reading on the scale 2 is unaffected by variations of voltage of the current source such as the battery 15. The position which the needle takes up at any time corresponds to the heating effect of the current in the windings 13 and 14 on the elements 8 and 9. If therefore the voltage of the battery 15 should, say, decrease, the heating effect of the windings 13 and 14 will both be proportionally decreased due to the fact that the windings 13 and 14 are in parallel across the same source 15. The heat imposed upon the elements 8 and 9 varies proportionally with changes of voltage and the forces on the needle balance each other at any position thereof so that for changes of voltage the position of the needle 1 and its indication on the scale 2 will not vary.

The disposition of the fingers 11 and 12 and of the elements 8 and 9 at right angles to each other as illustrated and with respect to the post 7 and the bearing 4—23—24, results in a large movement of the needle 1 for a small displacement or distortion of the elements 8 and 9.

Figure 3:
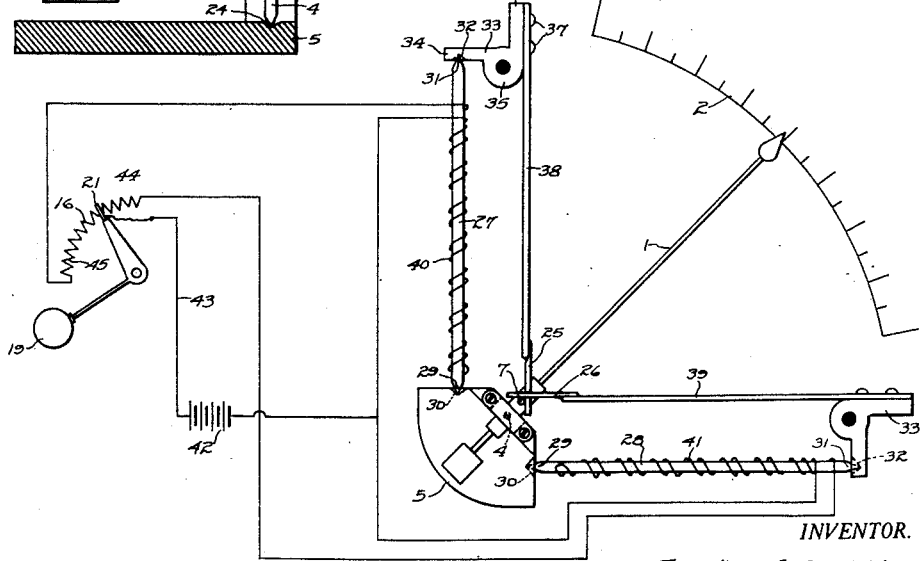
Fig. 3 is a view similar to Fig. 1 illustrating another embodiment of my invention.

In the form of my invention illustrated in Fig. 3, the construction of the needle including the post 7 and the bearings therefor may be the same as or similar to that shown in Fig. 1. In this form however the bi-metallic elements are replaced by longitudinally thermally expansible elements 27 and 28. The elements 27 and 28 at their inner ends are pointed as at 29 and seated in sockets 30—30 in the base 5. At their outer ends the elements 27 and 28 are similarly pointed as at 31—31 and seated in sockets 32—32 formed in rocking devices 33—33.

The rocking devices 33 comprise each an arm 34 in which is formed the socket 32 and a pivot bearing 35 disposed laterally of the socket 32. The devices 33 have each also an arm 36 to which are riveted as at 37 a pair of resilient elements 38 and 39. The elements 38 and 39 are preferably disposed substantially at right angles to each other, being formed rectilinearly for this purpose, and at their inner free ends are provided with a corresponding pair of fingers 25 and 26 disposed in mechanical contact with the post 7 similarly to the arrangement in Fig. 1 except that in the form of Fig. 3, the fingers 25 and 26 are on the side of the post away from the shaft 4.

Heating windings 40 and 41 are provided on the elements 27 and 28 respectively and when heated by electric current to be described, the elements 27 and 28 expand longitudinally, rocking the rocking devices 33 around their pivots 35 and causing the elements 38 and 39 through the agency of their fingers 25 and 26 to exert resilient forces on the post 7 tending to rotate the needle 1 around its pivot 4—23—24. By providing the pivot bearing construction 29—30 and 31—32 at the ends of the elements 27 and 28, these elements are rendered free to respond to their changes of temperature uninfluenced by the rotation of the rocking devices around a pivot.

As will now be understood, the needle 1 will take up a position corresponding to the differences in the expansion of the elements 27 and 28 which in turn corresponds to the quantities of heat supplied thereto by the windings 40 and 41. Current for the windings 40 and 41 may be supplied from a local source such as a battery 42. Current from the battery 42 flows by wire 43 to a contact 21 on the rheostat 16, which may be operated by a float 19 similarly to the arrangement shown in Fig. 1.

From the contact 21, the current flows through a portion of the resistance 44 to energize the winding 41 and current also flows through the contact 21 through another portion of the resistance 45 to energize the winding 40. Thus upon movement of the contact 21 to decrease the resistance 44, the resistance 45 is correspondingly increased. With this arrangement the windings 40 and 41 and the elements 27 and 28 and their associated parts may be duplicates of each other. When the contact 21 is in its mid position and the resistances 44 and 45 are equal, the elements 27 and 28 will be expanded equally and the needle 1 will take up its middle or average position.

Upon a change of liquid level, the resistances 44 and 45 will be made unequal by movement of the contact 21, and the elements 27 and 28 will be expanded unequally, one being increased and the other correspondingly decreased, and the needle 1 will be moved to a corresponding position at one side or the other of the central position illustrated.

In this arrangement as in Fig. 1, the position of the needle 1 is uninfluenced by changes of voltage of the source 42, the heat supplied to the elements 27 and 28 continuing to bear the same proportion at different voltages of the battery 42 due to the parallel disposition of the windings 40 and 41 with respect to each other.

My invention is not limited to the exact details of construction shown and described. Many changes therein and modifications thereof may be made without departing from the spirit of my invention or sacrificing its advantages.

I claim:

1. In a device of the class described, a pair of bi-metallic thermo-responsive elements, fixed at one end and at their free ends disposed for movement in directions substantially at right angles to each other, an indicating element, and a connection between the free ends of the bi-metallic elements and the indicating element whereby the bi-metallic elements when heated may exert opposing forces on the indicating element tending to move it, and electric heaters for independently heating the respective thermo-responsive elements.

2. In a device of the class described, a movable indicating element, a pair of resilient elements disposed substantially at right angles to each other and having their adjacent end portions freely movable, a connection between the indicating element and the movable portion of the resilient elements respectively whereby the resilient elements when moved may resiliently exert two opposing forces on the indicating element tending to move it, a pair of linearly expansible thermo-responsive elements, a connection between the thermo-responsive elements and the resilient elements whereby expansion of the thermo-responsive elements may cause movement of the free end portions of the resilient elements to resultantly effect movement of the indicating element, and electric heaters for independently heating the thermo-responsive elements.

3. In a device of the class described, a movable indicating element, a pair of resilient elements disposed substantially at right angles to each other and having their adjacent end portions freely movable, a connection between the indicating element and the movable portion of the resilient elements respectively whereby the resilient elements when moved may resiliently exert two opposing forces on the indicating element tending to move it, a pair of linearly expansible thermo-responsive elements, a connection between the thermo-responsive elements and the resilient elements whereby expansion of the thermo-responsive elements may move the free end portions of the resilient elements to resultantly cause movement of the indicating element, the said connection between the thermo-responsive elements and the resilient elements magnifying the movement of the former and electric heaters for independently heating the thermo-responsive elements.

4. In a device of the class described, a movable indicating element pivotally mounted to oscillate about an axis, a pair of resilient elements each fixed at one end and at their free ends disposed for movement substantially at right angles to each other, a connection between the indicating element and the free ends of the resilient elements, the connection being positioned at a point spaced from the axis of the indicating element, the resilient elements each being resiliently stressed between the fixed end and the connection with the indicating element at the free end, and exerting opposing forces on the indicating element tending to move it in opposite directions, the indicating element taking up a position at a balance of the forces of the two resilient elements, and means associated with each resilient element to vary the forces exerted by said resilient elements, said means including an electric heater, a thermally expansible element responsive thereto, and a circuit for supplying current to said heater.

5. In a device of the class described, a movable indicating element pivotally mounted to oscillate about an axis, a pair of resilient elements each fixed at one end and at their free ends disposed for movement substantially at right angles to each other, the free ends of the resilient elements being connected to the indicating element at a common point spaced from the axis of the indicating element, the resilient elements each being resiliently stressed between the fixed end and the connection with the indicating element at the free end, and exerting opposing forces on the indicating element tending to move it in opposite directions, the indicating element taking a position at a balance of the forces of the two resilient elements, and means associated with each resilient element to vary the forces exerted by said resilient elements, said means including an electric heater, a thermally expansible element responsive thereto, and a circuit for supplying current to said heater.

6. In a device of the class described, a movable indicating element pivotally mounted to oscillate about an axis, a pair of resilient elements each fixed at one end, the free ends of the resilient elements being connected to the indicating element at a common point spaced from the axis of the indicating element, the resilient elements each being resiliently stressed between the fixed end and the connection with the indicating element at the free end, and exerting opposing forces on the indicating element tending to move it in opposite directions, the indicating element taking a position at a balance of the forces of the two resilient elements, and means associated with each resilient element to vary the force exerted by said resilient elements, said means including an electric heater, a thermally expansible element responsive thereto, and a circuit for supplying current to said heater.

7. In a device for indicating variations of a variable factor which effects corresponding variations of current in an electric circuit, a movable indicating element, a pair of resilient elements associated with the indicating element, a pair of thermally expansible elements associated with the resilient elements to effect movement thereof to cause them to exert opposing thermally effected resilient forces on the indicating element tending to move it to indicating positions of balance of said resilient forces, an electric heater for each thermostat adapted to supply heat to its associated thermostat proportional to the current passing therethrough, and an electric circuit connecting the heaters in parallel and including a common source of power for energizing the heaters.

THEODORE J. SMULSKI.